United States Patent
Ujibashi et al.

(10) Patent No.: US 8,832,703 B2
(45) Date of Patent: Sep. 9, 2014

(54) DYNAMICALLY CHANGING JOB ALLOCATION PRIORITY BASED ON A RESTORATION RATE FOR EACH USER AND TIME FRAME

(75) Inventors: Yoshifumi Ujibashi, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1254 days.

(21) Appl. No.: 12/337,272

(22) Filed: Dec. 17, 2008

(65) Prior Publication Data

US 2009/0288090 A1    Nov. 19, 2009

(30) Foreign Application Priority Data

May 15, 2008    (JP) .................................. 2008-128110

(51) Int. Cl.
G06F 9/46    (2006.01)
G06F 9/50    (2006.01)

(52) U.S. Cl.
CPC .................................. G06F 9/5011 (2013.01)
USPC ......................................................... 718/103

(58) Field of Classification Search
None
See application file for complete search history.

(56) References Cited

U.S. PATENT DOCUMENTS 6,101,460 A * 8/2000 Brinkerhoff et al. ......... 702/179
6,920,632 B2 7/2005 Donovan et al.
2003/0074387 A1 4/2003 Tanaka
2005/0114861 A1 * 5/2005 Mitchell ....................... 718/100
2009/0199196 A1 * 8/2009 Peracha ....................... 718/104

FOREIGN PATENT DOCUMENTS

| JP | A 7-253893 | 10/1995 |
| JP | 2003091424 | 3/2003 |
| JP | 2005536791 | 12/2005 |
| JP | A 2006-48275 | 2/2006 |

OTHER PUBLICATIONS

"Platform LSF Family—Platform Computing" [Online] [Retrieved on Apr. 24, 2008] <http://www.platform.com/Products/platform-lsf-family>.
Notice of Rejection dated Mar. 6, 2012, from corresponding Japanese Patent Application No. 2008-128110 (with English translation).

* cited by examiner

*Primary Examiner* — Meng An
*Assistant Examiner* — Eric C Wai
(74) *Attorney, Agent, or Firm* — Greer Burns & Crain Ltd.

(57) ABSTRACT

A disclosed priority control program recorded in a computer-readable medium causes a computer to execute, in job allocation for computational resources, a first step of lowering a job allocation priority of a user based on an estimated utilization amount of a job associated with the user, the job allocation priority indicating a degree of priority of the user in obtaining an allocation of the computational resource, and the estimated utilization amount being an amount of the computational resources estimated to be used for the job and being submitted to and recorded in a memory device on a job-to-job basis; and a second step of increasing the job allocation priority over time at a restoration rate which corresponds to a user-specific amount of the computational resources available for the user per unit time, the user-specific amount being recorded in the memory device on a user-to-user basis.

9 Claims, 13 Drawing Sheets

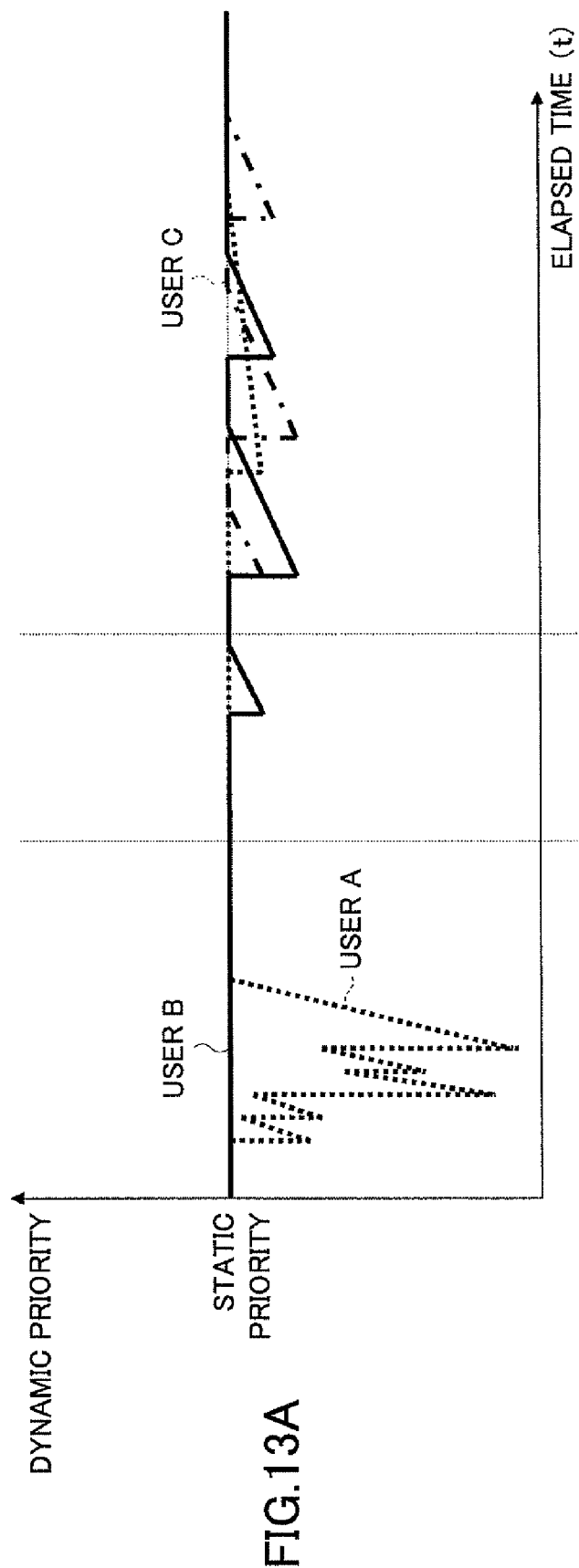
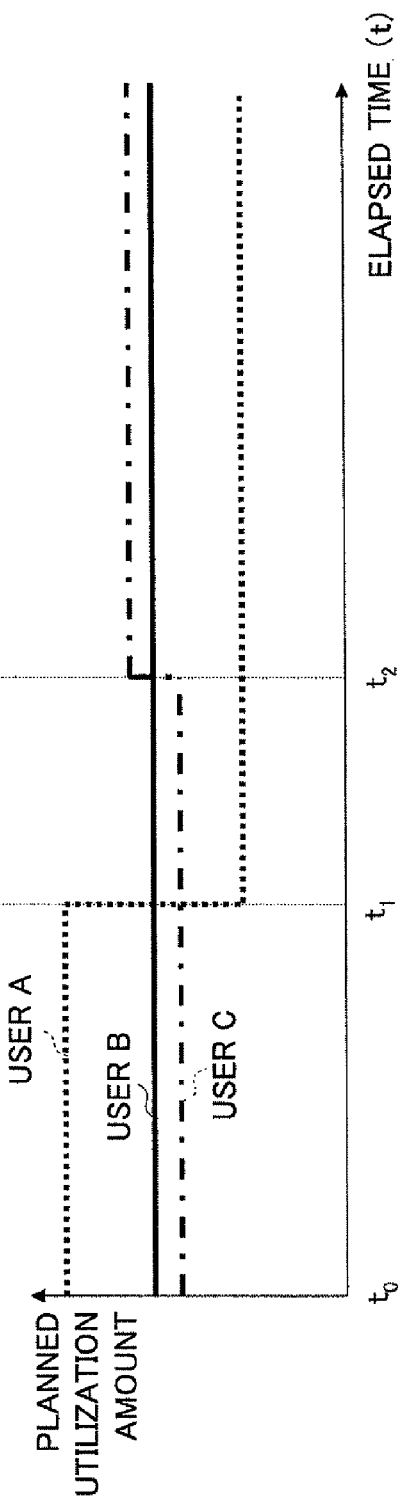

DYNAMICALLY CHANGING JOB ALLOCATION PRIORITY BASED ON A RESTORATION RATE FOR EACH USER AND TIME FRAME

CROSS-REFERENCE TO RELATED APPLICATIONS

This application is based upon and claims the benefit of priority of Japanese Patent Application 2008-128110, filed on May 15, 2008, the entire contents of which are hereby incorporated herein by reference.

FIELD

The disclosure herein is directed to a priority control program, a priority control apparatus and a priority control method.

BACKGROUND

Conventionally, high work load jobs related to science and technology and the like (for example, calculations requiring a few days to complete) are processed using, for example, parallel supercomputers and computer clusters (hereinafter referred to as "computational resources") at computer centers and similar facilities. In general, such computational resources are shared by multiple users (for instance, several tens of researchers). Accordingly, in order to fairly allocate limited computational resources to all the users, execution scheduling for jobs submitted by users has to be performed in an appropriate manner.

Execution of jobs in such a case is generally performed as follows.

(1) Users submit jobs to a job queue of a job scheduler.

(2) The job scheduler dispatches jobs in the job queue to the computational resources in order of priority of the jobs. This process is carried out until there are no more jobs in the job queue or until there are no more allocatable computational resources.

(3) If, for example, due to a new job submission by a user or job completion, a trigger occurs which allows a job in the job queue to be dispatched, the scheduling process of (2) above is performed.

Priorities of individual jobs (job priorities) are basically determined at each time when a new job is submitted, based on the order of job submissions or user's priorities associated with the jobs. Note that the user's priorities (hereinafter referred to as "user priorities") are used as an index to define the order of priority among the users, and are different from the job priorities. However, if the dispatch order is determined only based on the job priorities defined each time a new job is submitted, the computational resources might be monopolized by a user with a higher priority or by a large number of jobs submitted earlier by one user. In order to prevent such exclusive use of the computational resources by a single user, conventional job schedulers have a fair-share scheduling function. As for a conventional fair-share scheduling function, if the amount of computational resources currently used by a user increases or the execution time of a job currently being executed becomes long, adjustments are made by lowering the user priority of this user so that the user priorities of other users increase in comparison.

A first example of conventional fair-share scheduling uses the following equation (1). The term "priority" used in this example refers to the user priority.

$$Pd(t)=Ps/(1+F(t)) \quad (1)$$

where t is the current time; Pd(t), a dynamic priority of a user concerned; Ps, a static priority of the user; and F(t), a function that increases as the elapsed time from the start of a job currently in execution (current job) becomes longer and, therefore, the amount of computational resources used by the current job associated with the user increases (this function becomes 0 when the current job is completed).

FIG. 1 is a simplified representation showing transition of the dynamic priority according to the first example of the conventional fair-share scheduling.

As shown in FIG. 1, according to Equation (1), the dynamic priority Pd(t) decreases with the lapse of the job execution time (that is, it decreases as the utilization amount of computational resources increases). Accordingly, fairness among multiple users can be secured in terms of utilization amounts of computational resources and user priorities. However, according to Equation (1), the dynamic priority Pd(t) is set back to the static priority Ps immediately after the job completion. This possibly allows jobs of the same user to continuously use the computational resources. In addition, since the dynamic priority Pd(t) is high immediately after the start of the job execution, a large number of jobs of a single user may be dispatched at once. In order to avoid the occurrence of such situations, the following equation (2) is used which is formed by incorporating terms pertaining to an execution time period of jobs executed in the past (past jobs) and a commitment time period into Equation (1).

$$Pd(t)=Ps/(1+F(t)+Ch\times(Th(t)+Tr(t))+Cc\times(Tc(t)-Tr(t))) \quad (2)$$

where Ch is a coefficient of the execution time period of past jobs; Cc, a coefficient of the commitment time period; Th(t), the total execution time period of the past jobs (note that the execution time period of each past job is multiplied by an attenuation coefficient so as to decrease over time); Tr(t), the total execution time period of the current job; and Tc(t), the total commitment time period (expected execution time period) of the current job.

FIG. 2 is a simplified representation showing transition of the dynamic priority according to the second example of the conventional fair-share scheduling.

"Ch×(Th(t)+Tr(t))" in Equation (2) corresponds to the term of the past job execution time period. The term of the past job execution time period is provided in order to prevent a user who has used a large amount of computational resources in the past from continuously using the computational resources after the completion of the current job. That is, by using the term of the past job execution time period, the dynamic priority Pd(t) is made to decrease according to the execution time period of past jobs. An attenuation coefficient is applied to the execution time period of each past job so that the degree of contribution of the execution time period of the past job decreases with time. Note that, in FIG. 2, a curved line after the job completion represents the effect of the term of the past job execution time period. Specifically, according to the scheduling of FIG. 1 (Equation (1)), the dynamic priority Pd(t) is restored to the static priority Ps immediately after the completion of the current job; however, according to the scheduling of FIG. 2 (Equation (2)), the dynamic priority Pd(t) is gradually restored after the completion of the current job. Herewith, the priority of the user who has used a large amount of computational resources is kept low for a while, thereby preventing continuous job execution by one user.

"Cc×(Tc(t)−Tr(t))" in Equation (2) corresponds to the term of the commitment execution time period. The term of the commitment execution time period is provided in order to prevent a large number of jobs of a single user from being dispatched at once. That is, by using the term of the commitment execution time period, a larger reduction in the dynamic priority Pd(t) is made if a larger value is obtained by subtracting the elapsed time from the start of the current job execution from the commitment time period (an expected job execution time period reported by the user at the time of the job submission)—i.e. the larger is the expected remaining execution time period of the current job. Herewith, the dynamic priority Pd(t) is made to decrease immediately after the start of the current job execution, thereby preventing a large number of jobs of a single user from being dispatched at once.

Patent Document 1: Japanese Laid-open Patent Application Publication No. 2006-48275

Patent Document 2: Japanese Laid-open Patent Application Publication No. H07-253893

However, the scheduling of Equation (2) leaves the problem that, although it requires appropriate values to be assigned to the respective parameters (e.g. Ch, Cc and the attenuation coefficient), it is difficult to do so since the parameters involved are large in number. That is, in general operational environments of job schedulers, amounts of computational resources available to individual users in a given time frame have been specified. Accordingly, it is preferable that dynamic priorities Pd(t) of individual users be adjusted by the fair-share scheduling function in such a manner that these users are able to use the amounts of computational resources individually specified for them. Specifically, adjustments should be made such that the dynamic priority Pd(t) of a first user, whose job in execution is using a larger amount of computational resources than the amount specified for the first user, decreases in comparison with the dynamic priority Pd(t) of a second user, whose job in execution is using only a fraction of the amount of computational resources specified for the second user. In this way, it is possible to preferentially allow the second user to use the computational resources.

However, with the scheduling of Equation (2), it is very difficult to assign appropriate values to the parameters so as to achieve the above-described adjustments. In order to cope with this problem, an additional function is conventionally provided besides the fair-share scheduling function. The additional function serves to keep on record computational resource amounts used by individual users and control the job execution of a user if the recorded computational resource amount of the user exceeds a limited amount allowed for the user.

SUMMARY

According to an aspect of the present disclosure, a priority control program causes a computer to execute, in job allocation for computational resources, a first step of lowering a job allocation priority of a user based on an estimated utilization amount of a job associated with the user, the job allocation priority indicating a degree of priority of the user in obtaining an allocation of the computational resource, and the estimated utilization amount being an amount of the computational resources estimated to be used for the job and being submitted to and recorded in a memory device on a job-to-job basis; and a second step of increasing the job allocation priority over time at a restoration rate which corresponds to a user-specific amount of the computational resources available for the user per unit time, the user-specific amount being recorded in the memory device on a user-to-user basis.

The object and advantages of the invention will be realized and attained by means of the elements and combinations particularly pointed out in the claims.

It is to be understood that both the foregoing general description and the following detailed description are exemplary and explanatory and are not restrictive of the present disclosure as claimed.

BRIEF DESCRIPTION OF DRAWINGS

FIGS. 13A and 13B show an example of transitions in dynamic priorities according to the second embodiment.

DESCRIPTION OF EMBODIMENTS

Embodiments that describe the best mode for carrying out the present disclosure are explained next with reference to the drawings.

(a) First Embodiment

Figure 1:
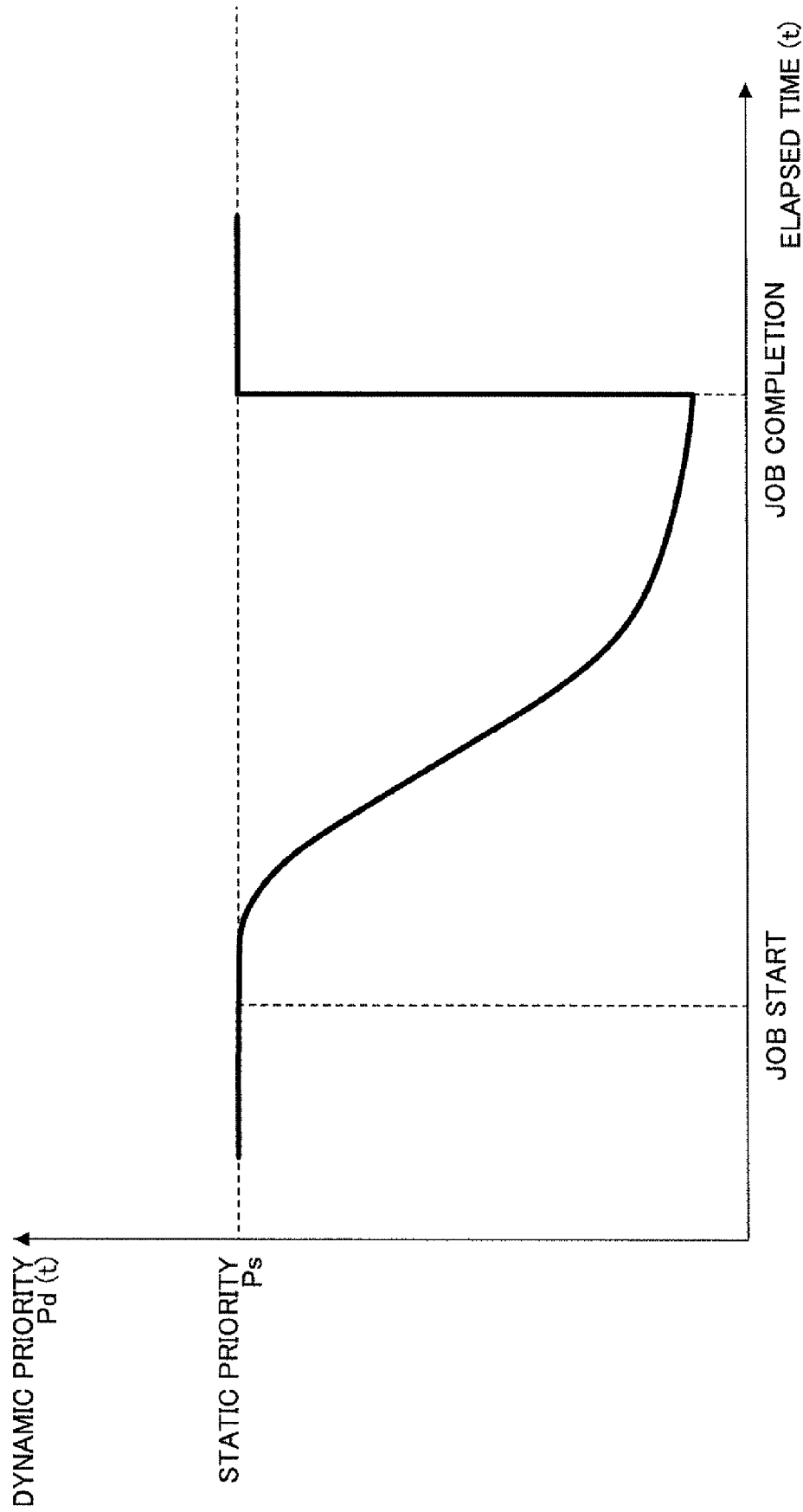
FIG. 1 is a simplified representation showing transition of a dynamic priority according to a first example of conventional fair-share scheduling.
Figure 2:
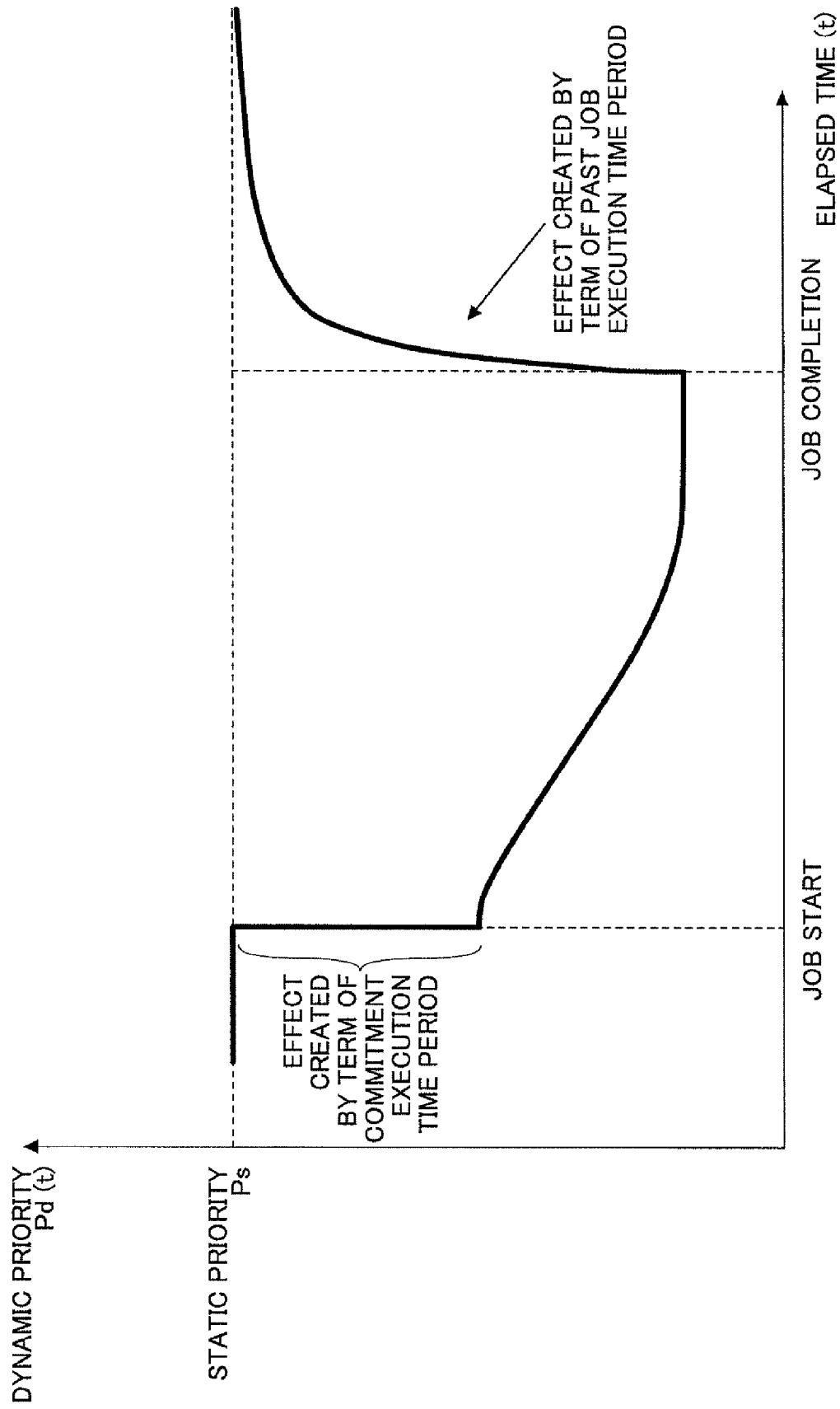
FIG. 2 is a simplified representation showing transition of the dynamic priority according to a second example of the conventional fair-share scheduling.
Figure 3:
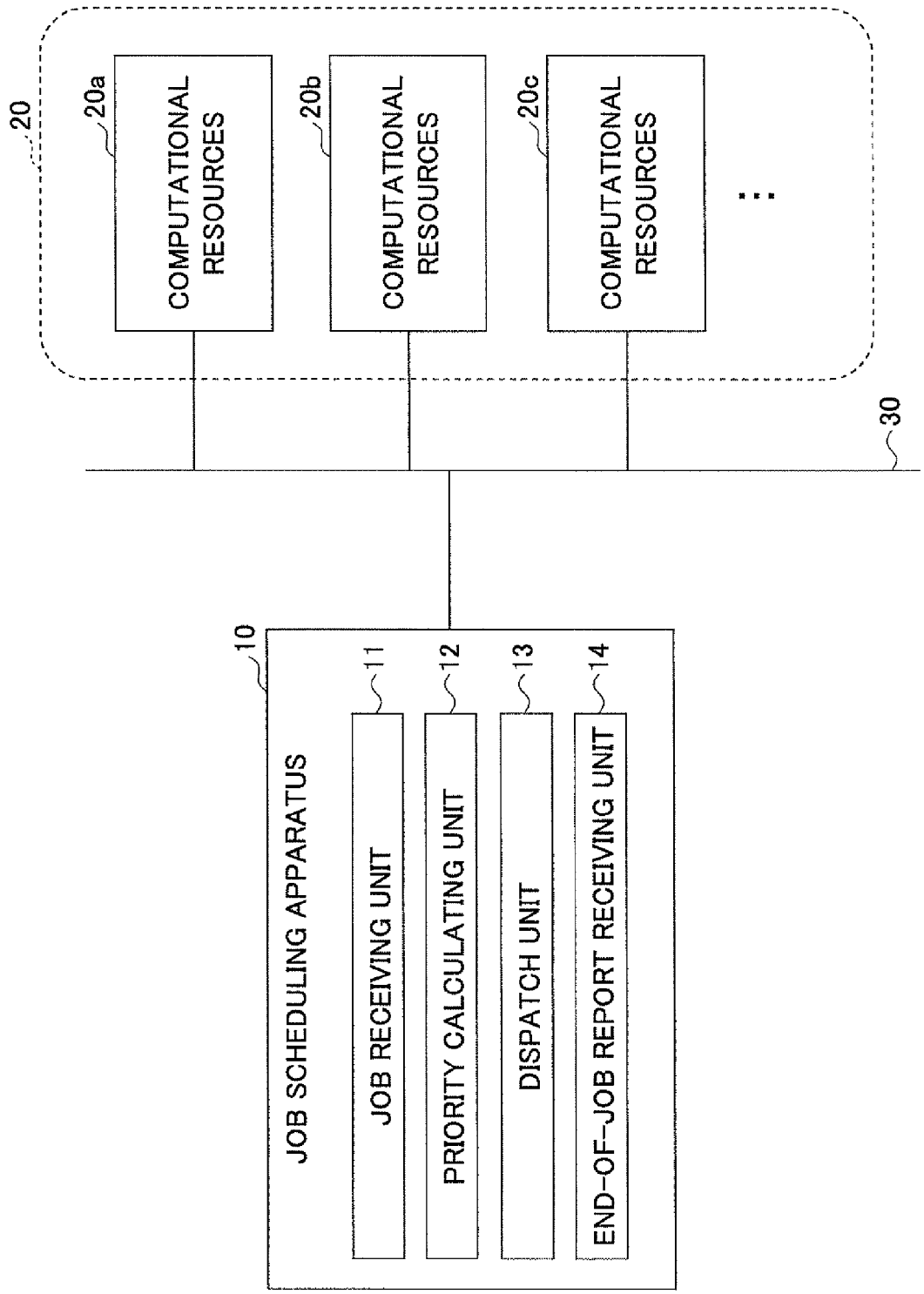
FIG. 3 shows a structural example of a calculation system according to one embodiment of the present disclosure.

FIG. 3 shows a structural example of a calculation system according to one embodiment of the present disclosure. In FIG. 3, a job scheduling apparatus 10 and one or more computational resources 20 are connected to each other via a network (either wired or wireless), such as a LAN (Local Area Network).

The job scheduling apparatus 10 is configured to, for example, receive job submissions from users, control the order for allocating (dispatching) the submitted jobs to the computational resources 20, and dispatch the jobs. The job scheduling apparatus 10 includes a job receiving unit 11, a priority calculating unit 12, a dispatch unit 13 and an end-of-job report receiving unit 14, of which functions are implemented in software. The functions of these units are made clear in the description of the operating procedures below.

The computational resources 20 are configured to execute allocated jobs, and examples of such are parallel supercomputers and computer clusters. That is to say, computational resources 20a, 20b and 20c exemplified in FIG. 3 do not necessarily form a single computer, and may be multiple computers connected by internetworking. Furthermore, the computational resources 20 may be regarded as one CPU or multiple CPUs.

Figure 4:
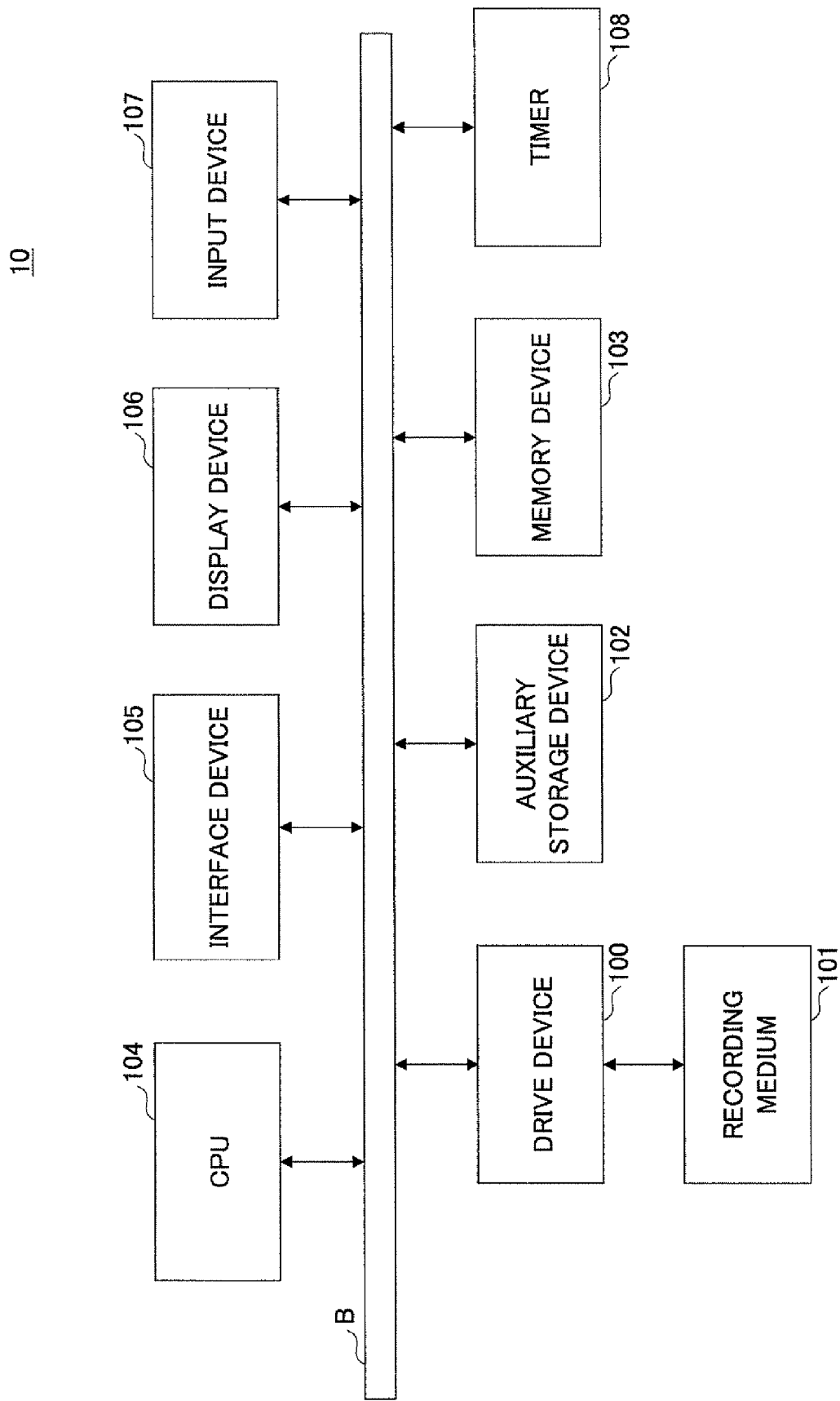
FIG. 4 shows an example of a hardware structure of a job scheduling apparatus of the present embodiment.

FIG. 4 shows an example of a hardware structure of the job scheduling apparatus 10 of the present embodiment. The job scheduling apparatus 10 of FIG. 4 includes a drive device 100, an auxiliary storage device 102, a memory device 103, a CPU 104, an interface device 105, a display device 106, an input device 107 and a timer 108, which are all connected to each other by a bus B.

A program for implementing processes of the job scheduling apparatus 10 is provided by a recording medium 101, such as a CD-ROM. The recording medium 101 on which the program is recorded is mounted on the drive device 100, and then the program is copied from the recording medium 101 and installed in the auxiliary storage device 102 via the drive device 100. The auxiliary storage device 102 stores necessary files, data and the like as well as the installed program.

The memory device 103 reads the program from the auxiliary storage device 102 and loads it in response to a direction to launch the program. The CPU 104 provides functions pertaining to the job scheduling apparatus 10 in accordance with the program loaded in the memory device 103. The interface device 105 is used to access the network. The display device 106 displays a GUI (Graphical User Interface) and the like corresponding to the program. The input device 107 includes a keyboard, a mouse and the like, and is used to input various operational directions. The timer 108 is a clock.

Note that the installation of the program does not always have to be made from the recording medium, and the program may be downloaded from another computer via the network.

Figure 5:
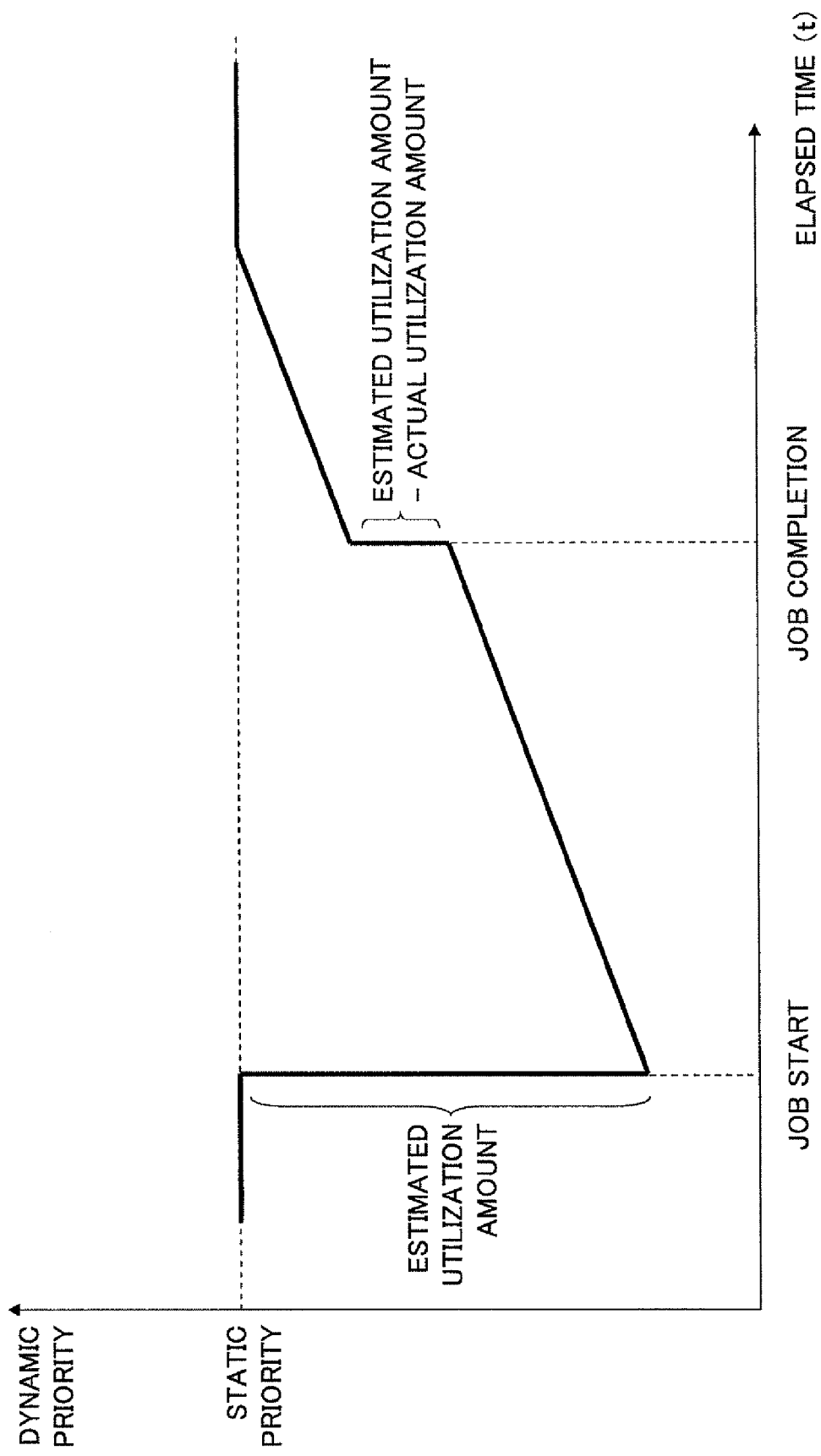
FIG. 5 shows an example of priority transition based on a priority control method of the present embodiment.

Next is described a general outline of a priority control method according to the present embodiment. FIG. 5 shows an example of priority transition based on the priority control method of the present embodiment.

According to the present embodiment, priorities of individual users that determine the order of dispatching (executing) their jobs dynamically change. Such priorities are referred to as "dynamic priorities". On the other hand, with respect to each user, a static priority is preliminarily assigned according to the importance of the user. The importance of a user may be decided in a timely manner depending on an intended operation, such as whether the user is a researcher who is engaged in important or urgent research, or a one-time user. The static priority is determined based on the amount of the computational resources 20 per unit time (e.g. the number of CPUs to be used×time period) specified to be available to each user. The more important the user is, the larger is the given amount of the computational resources 20 per unit time is given. Accordingly, the more important the user is, the higher is the given static priority. Note that in the case of making no distinction between the static priority and the dynamic priority, the term "priority" is simply used. In the present embodiment, the maximum value of the priority is "0". Note however that since the priority is a comparative index, an absolute value of the priority does not have particular significance.

Once a job is dispatched and the computational resources 20 start executing the job (job start), a penalty is imposed on the user associated with the job. That is, as illustrated in FIG. 5, the dynamic priority of the user is lowered at the start of the job execution by an amount of the computational resources 20 estimated to be used for the job (e.g. the number of CPUs to be used x an estimated execution time period; hereinafter referred to simply as "estimated utilization amount", or sometimes "EUA"). When the user is being penalized, the dynamic priority of the user becomes comparatively lower than the dynamic priorities of other users, and accordingly, the job dispatch order for the user is moved down in the job queue. Note that the estimated utilization amount of the job is entered by the user at the time of submitting the job to the job scheduling apparatus 10.

After the penalty is imposed at the start of the job execution (i.e. after the dynamic priority of the user associated with the job is lowered), the dynamic priority is gradually restored over time at a restoration rate, which is determined according to the amount of the computational resources 20 per unit time available for the user. Accordingly, the penalty is reduced more quickly if the user has been given a larger available amount of the computational resources 20 per unit time. In FIG. 5, the dynamic priority increases (rises) linearly between the job start and the job completion. Note that the maximum value of the dynamic priority is equal to the static priority. Therefore, after the dynamic priority reaches the level of the static priority, the dynamic priority does not increase over the static priority level.

As an optional approach, at the completion of the current job, the dynamic priority may be changed (increased or decreased) according to the difference between the estimated utilization amount used as a penalty to lower the dynamic priority of the user at the job start and the amount of the computational resources 20 actually used for the current job ("actual utilization amount", or sometimes "AUA"). FIG. 5 illustrates an example where the dynamic priority is increased at the job completion by the difference between the estimated utilization amount and the actual utilization amount (EUA−AUA). A conventional job scheduler forcibly terminates the current job at the point when the actual time period exceeds the estimated time period; however, in the case of the job scheduler that allows EUA<AUA (i.e. allows a value obtained by subtracting the actual utilization amount from the estimated utilization amount to be a negative value) as illustrated in FIG. 5, the dynamic priority may be lowered (decreased) by an amount corresponding to the difference between those two. By adopting such an optional approach, a gap between the estimated utilization amount and the actual utilization amount can be compensated for, which allows the dynamic priority to be controlled in a more fair way.

According to the dynamic priority control method of the present embodiment as described above, the job dispatch order for a user whose job in execution is using a larger amount of computational resources 20 than the available amount specified for the user is moved down in the job queue (that is, the dynamic priority is not restored to the level of the static priority even after the lapse of the unit time). Herewith, it is possible to provide such a fair-share scheduling function that allows individual users to fairly use the computational resources 20 in accordance with the amounts of the computational resources 20 allocated for them (i.e. it is possible to provide adjustments of the dynamic priorities).

In the present embodiment, a parameter required to be assigned in advance by an administrator or the like is only the amount of the computational resources 20 per unit time specified to be available for each user. Accordingly, the parameter assignment is very simple. In addition, according to the present embodiment, a user does not become limited in the use of the computational resources 20 (e.g. job dispatch being not allowed, or job reception is rejected) as soon as his job in execution exceeds the usage limit (i.e. the amount of the computational resources 20 per unit time specified to be available for the user). Therefore, favorable conditions are provided also for the individual users. In addition, it is possible to prevent a single user from continuously utilizing the computational resources 20 or dispatching a large number of jobs at once.

Next are specifically described operating procedures implemented by the job scheduling apparatus 10 in order to achieve the above-described priority control.

Figure 6:
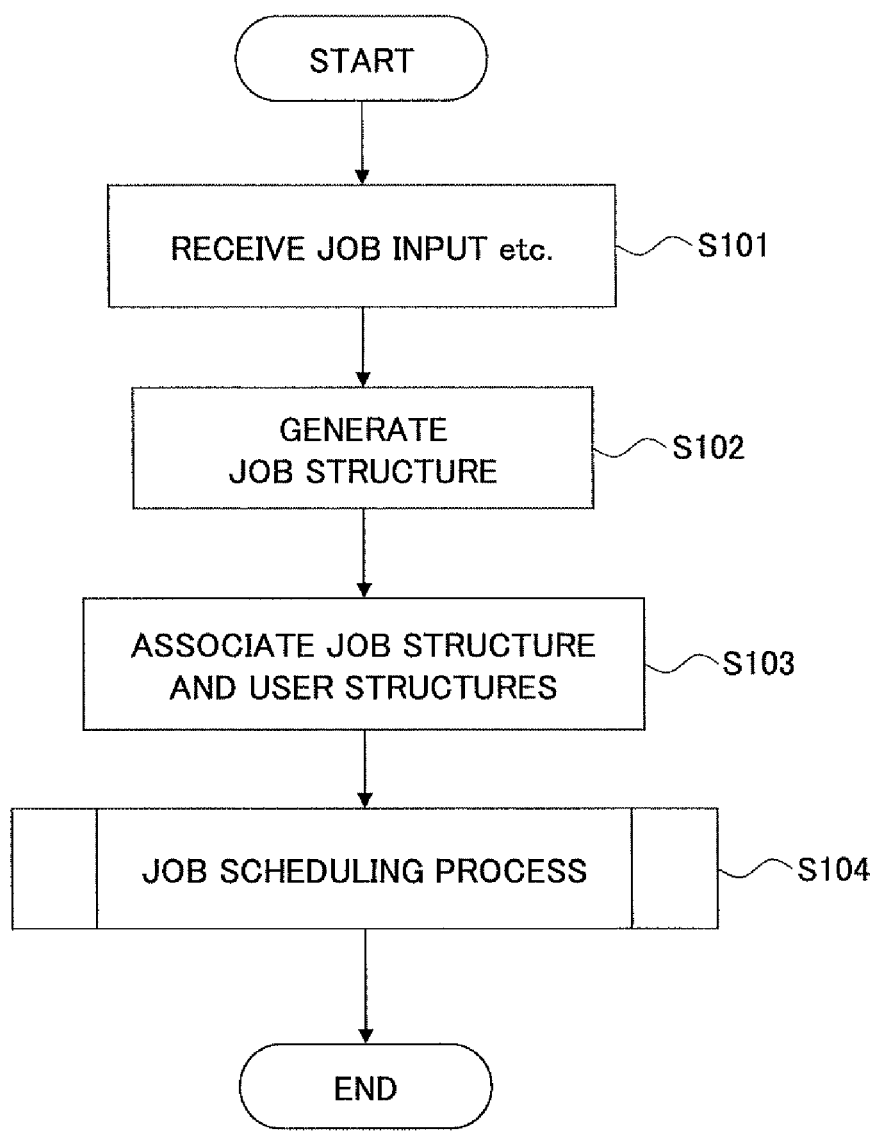
FIG. 6 is a flowchart for explaining an operating procedure implemented by the job scheduling apparatus at the time of job submission, according to the first embodiment.

FIG. 6 is a flowchart for explaining an operating procedure implemented by the job scheduling apparatus 10 at the time of job submission, according to the first embodiment.

In Step S101, the job receiving unit 11 receives a job, an identifier of a user requesting the execution of the job (user ID), the number of CPUs to be used and an estimated execution time period for the job via the display device 106, the input device 107 and the like. Subsequently, the job receiving unit 11 generates a job structure of the job in the memory device 103, and records in the generated job structure a job ID of the job, the number of CPUs to be used, the estimated execution time period and the like (Step S102). The "job structure" refers to data (structure) for managing information pertaining to the job, and is generated with respect to each job.

Next, the job receiving unit 11 associates the generated job structure and a user structure based on the user ID (Step S103). The "user structure" herein refers to data (structure) for managing information pertaining to the user (user information), and is generated in the memory device 103 for each user at a predetermined timing (for example, at the start-up of the job scheduling apparatus 10) based on user information persisting (stored) in the auxiliary storage device 102.

Figure 7:
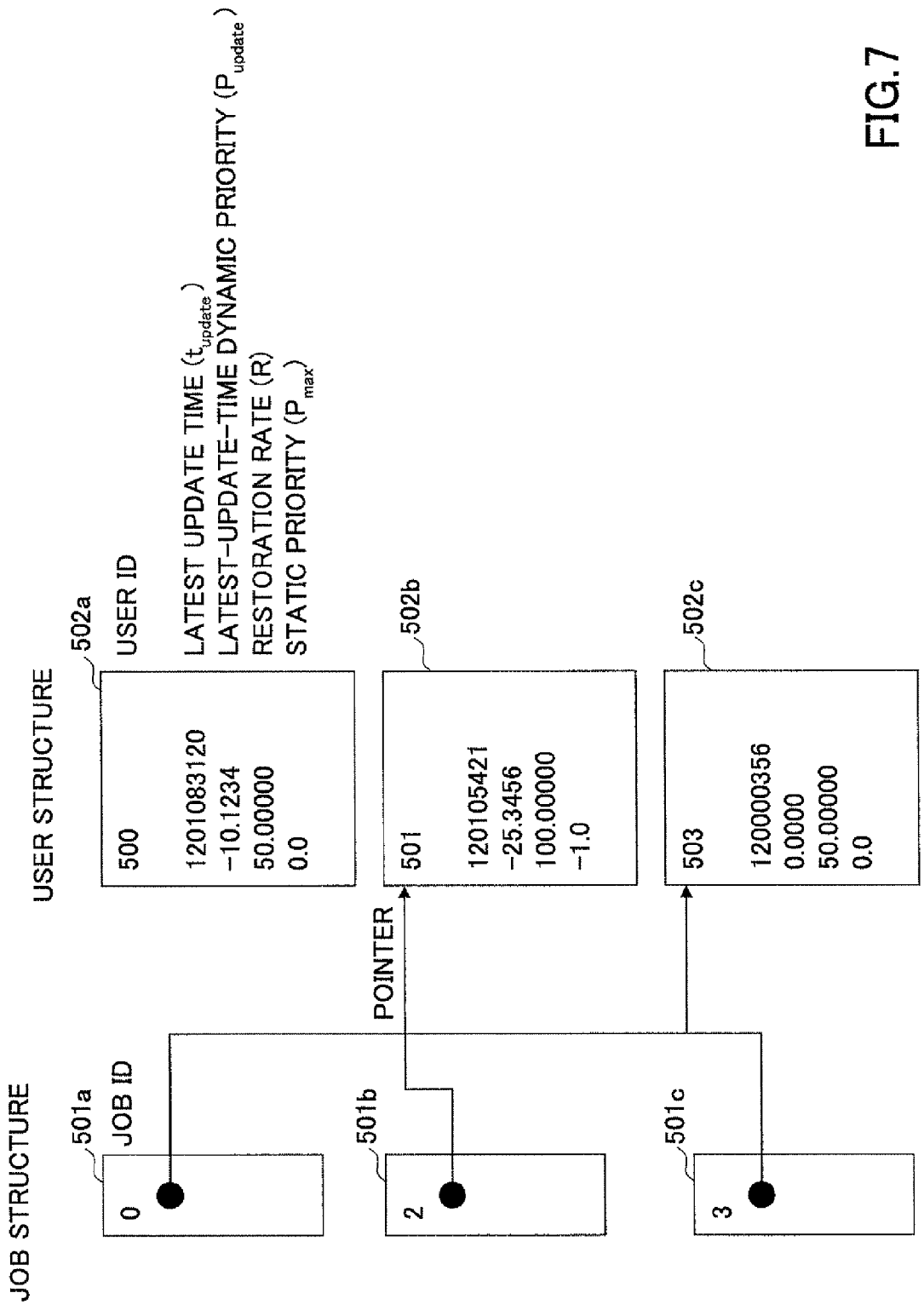
FIG. 7 shows job structures and user structures in association.

FIG. 7 shows job structures and user structures in association. FIG. 7 illustrates job structures 501a, 501b and 501c and user structures 502a, 502b and 502c.

By associating a job structure with a user structure, a pointer (position information or identification information) to the associated user structure is registered in the job structure. In FIG. 7, the job structures 501a and 501c are associated with the user structure 502c. The job structure 501b is associated with the user structure 502b. Note that job IDs of the job structures 501a, 501b and 501c are 0, 2 and 3, respectively.

The user structure has as member variables a user ID, a latest update time ($t_{update}$), a dynamic priority at the latest update time (hereinafter, the latest-update-time dynamic priority, $P_{update}$), a restoration rate (R), static priority ($P_{max}$) and the like. The user ID is the same as described above. The latest update time is a latest implementation time of a scheduling process (i.e. latest dynamic priority update time) to be described below. Accordingly, the latest-update-time dynamic priority is a dynamic priority calculated in the latest implementation of the scheduling process. The restoration rate is a restoration rate of the dynamic priority, and is calculated based on the amount of the computational resources 20 per unit time available for the user. More specifically, the restoration rate represents a restoration amount of the dynamic priority per unit time, which corresponds to the amount of the computational resources 200 per unit time available for the user. That is, the restoration rate is obtained by dividing the amount of the computational resources 200 available for the user by the unit time. The static priority is a static priority of the user, and treated as the maximum value of the dynamic priority.

Next, the job scheduling apparatus 10 performs job scheduling (i.e. determination of the order for dispatching jobs, dispatch, and the like) using the job structures, the user structures and the like (Step S104).

Figure 8:
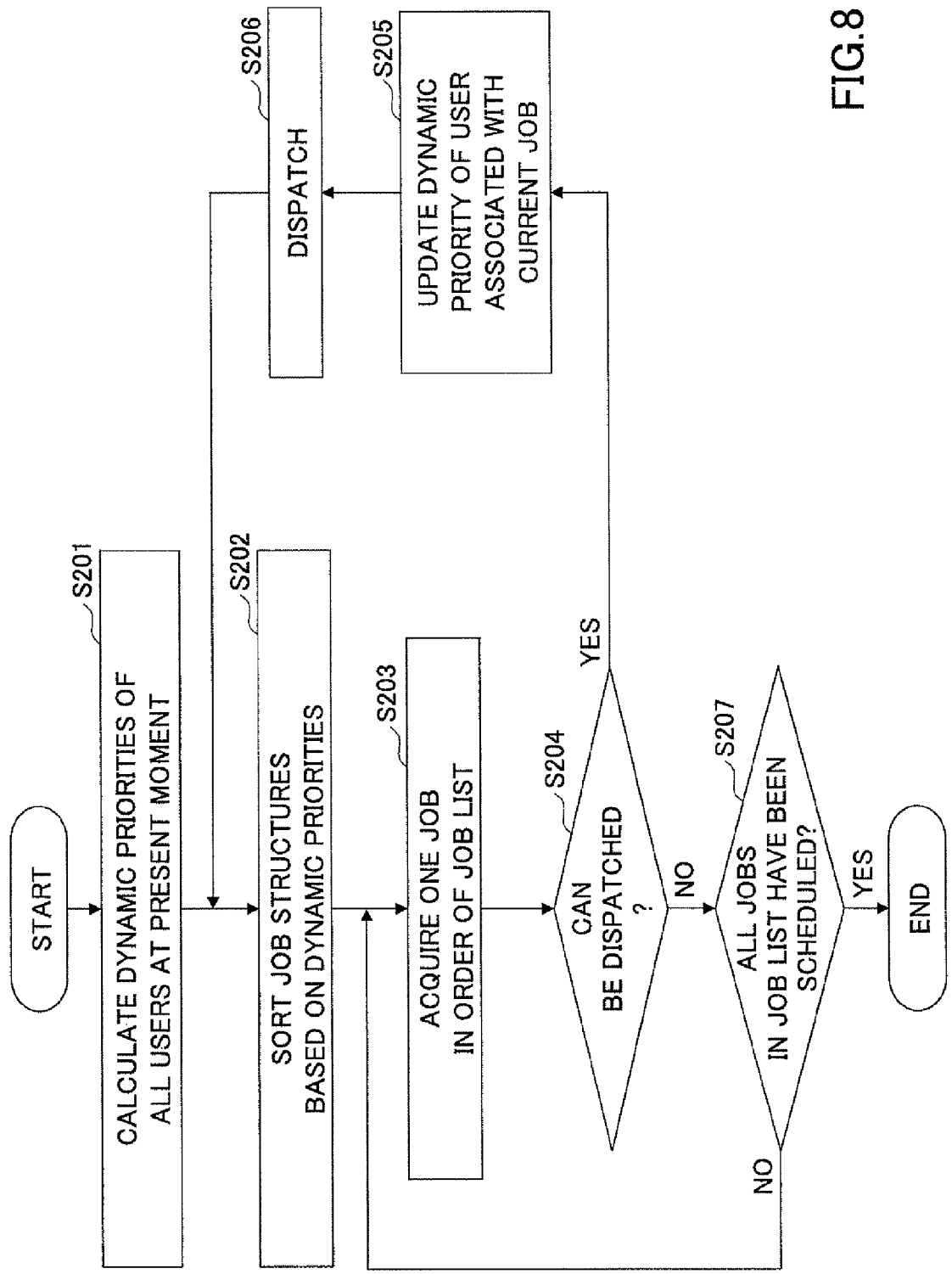
FIG. 8 is a flowchart for explaining an operating procedure of a job scheduling process according to the first embodiment.

The process performed at Step S104 is described next in more detail. FIG. 8 is a flowchart for explaining an operating procedure of the job scheduling process according to the first embodiment. The job scheduling process of FIG. 8 is implemented not only at the time of job submission, and repeated at predetermined intervals (e.g. periodically).

In Step S201, the priority calculating unit 12 calculates dynamic priorities of all users at the present moment based on all user structures loaded in the memory device 103 (Step S201). Note that "all users" here means users whose user information has been registered in the job scheduling apparatus 10 as users of the calculation system, and therefore is not limited to those associated with jobs currently submitted.

The dynamic priority at the present moment $P_{now}$ is calculated using the following equation.

$$P_{now} = P_{tmp} \text{ (if } P_{tmp} < P_{max}\text{)}$$

$$P_{now} = P_{max} \text{ (if } P_{tmp} \geq P_{max}\text{)}$$

when $P_{tmp} = P_{update} + R \times (t_{now} - t_{update})$ where $P_{update}$ is the last-update-time dynamic priority; $P_{max}$, static priority of each user; R, the restoration rate; $t_{now}$, the present time; and $t_{update}$, the latest update time.

That is, the dynamic priority $P_{now}$ is basically a value obtained by adding the restored priority amount according to the lapse of time $R \times (t_{now} - t_{update})$ to the last-update-time dynamic priority $P_{update}$. Note however that the maximum value of the dynamic priority is equal to the static priority $P_{max}$ of the user. All values for the parameters required to perform the above calculation, except for $t_{now}$, are stored in the corresponding user structures and used for the calculation. The value for the parameter $t_{now}$ is obtained from the timer 108.

The priority calculating unit 12 also updates the member variables of each user structure based on the dynamic priority calculation. Specifically, the priority calculating unit 12 assigns the present time to the latest update time $t_{update}$, and assigns the dynamic priority at the present moment to the latest-update-time dynamic priority $P_{update}$. Note that the dynamic priority calculating process in Step S201 is for achieving the linear restoration of the dynamic priority illustrated in FIG. 5.

Next, the dispatch unit 13 sorts the job structures in descending order of the latest-update-time dynamic priority of user structures associated with the job structures (Step S202).

Figure 9:
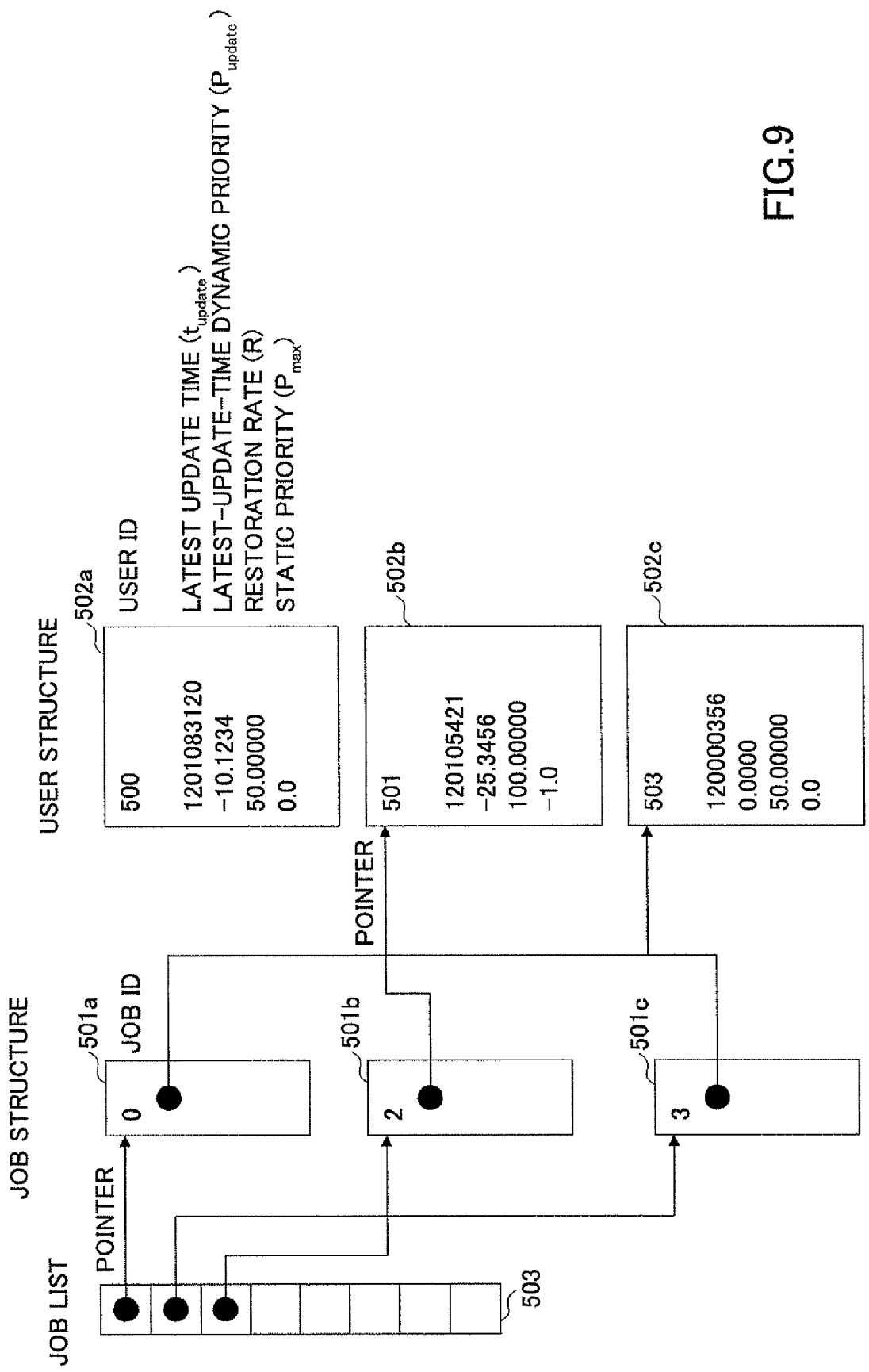
FIG. 9 shows a data structure obtained by sorting the job structures.

FIG. 9 shows a data structure obtained by sorting the job structures. As shown in FIG. 9, the sorting result of the job structures is registered in a job list 503, which is an array of pointers pointing to the job structures. That is, the pointers of the job structures are registered in individual fields of the job list 503 in the sorted order. In FIG. 9, pointers of the job structures 501a and 501c associated with the user structure 502c, the latest-update-time dynamic priority of which is 0.0000, are registered in the first and second fields, respectively, in the job list 503. Then, a pointer of the job structure 501b associated with the user structure 502b, the latest-update-time dynamic priority of which is −25.3456, is registered in the third field in the job list 503.

As for the user structures 502a-502c in FIG. 9, the values of the dynamic priorities and the like are the same as those in FIG. 7, and it thus seems no update has been made compared to FIG. 7; however, this is simply a matter of convenience.

Next, the dispatch unit 13 refers to a job structure in order of registration shown in the job list 503, and acquires a job corresponding to the job structure (S203). Note that, in the present embodiment, entities of jobs are not particularly limited, and they may be a collection of parameters for calculation, or data including calculation logic (programs). In any case, jobs waiting to be dispatched are associated with job IDs and then loaded in the memory device 103 or recorded in the auxiliary storage device 102. Accordingly, in Step S203, the dispatch unit 13 is able to acquire a job based on the job ID of the referred-to job structure.

Next, the dispatch unit 13 determines if the acquired job (current job) can be allocated (dispatched) to the computational resources 20 (Step S204). This determination is made based on whether as much computational resources 20 as the current job requires (the number of CPUs to be used) are available.

If as much computational resources 20 as the current job requires are available (Yes in Step S204), the priority calculation unit 12 updates the latest-update-time dynamic priority $P_{update}$ of a user associated with the current job (Step S205). This update is made according to the following calculation.

$$P_{update} \leftarrow P_{update} - r \times T_{estimate}$$

where $T_{estimate}$ is the estimated execution time period; and r is the number of CPUs to be used.

In the calculation, ($r \times T_{estimate}$) corresponds to the estimated utilization amount of the computational resources 20. That is, the update is for achieving a decrease in the dynamic priority at the job start in FIG. 5. As for the latest-update-time dynamic priority $P_{update}$ in the above calculation, the value of a user structure associated with the job structure of the current job is used. As for the number of CPUs to be used r and the estimated execution time $T_{estimate}$ in the above calculation, the values recorded in the job structure of the current job are used. In the user structure associated with the user of the current job, the latest-update-time dynamic priority $P_{update}$ is updated with the calculated latest-update-time dynamic priority $P_{update}$, and the latest update time $t_{update}$ is updated with the start (dispatch) time of the current job.

Next, the dispatch unit 13 dispatches the current job to allocated computational resources 20 (Step S206). Herewith, the dispatched current job is received and then executed by the allocated computational resources 20. Note that with the dispatch of the current job, the dispatch unit 13 records the job start time in the job structure of the current job.

On the other hand, if as much computational resources 20 as the current job requires are not available (No in Step S204), the dispatch unit 13 determines if all the job structures registered to the job list 503 have been scheduled (Step S207). If there is one or more unscheduled job structures (No in Step S207) the dispatch unit 13 performs Step S203 and the subsequent steps for each of the unscheduled job structures. When scheduling of all the job structures is completed (Yes in Step S207) the dispatch unit 13 ends the scheduling process.

If determining in Step S204 that the current job cannot be dispatched, the dispatch unit 13 may be in standby until the current job is allowed to be dispatched (i.e. until the number of CPUs to be used for the current job becomes available).

Figure 10:
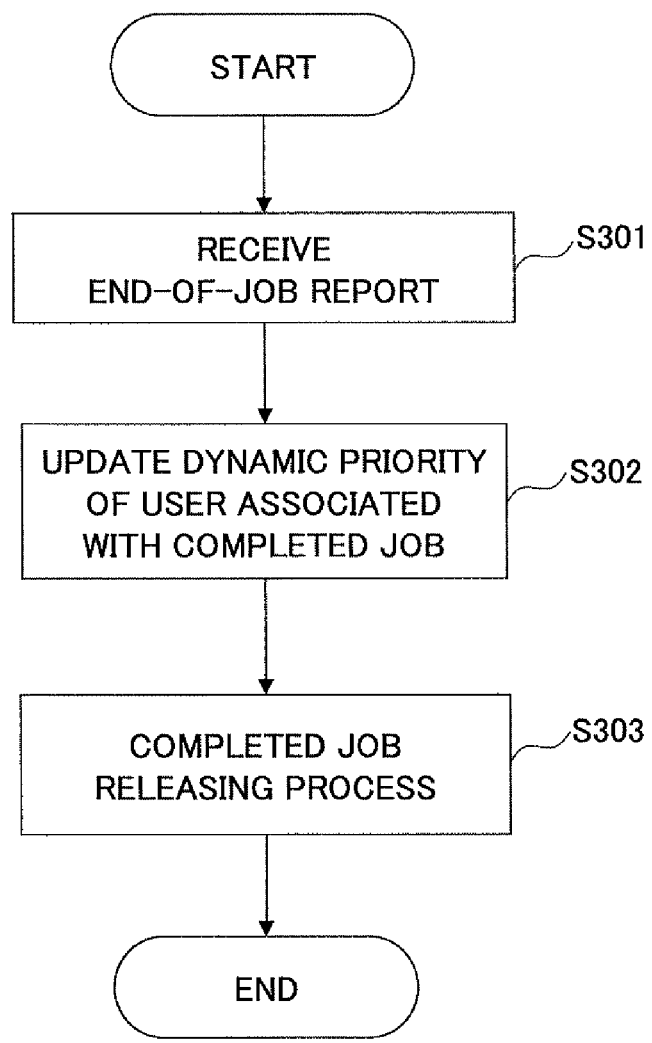
FIG. 10 is a flowchart for explaining an operating procedure implemented by the job scheduling apparatus at job completion, according to the first embodiment.

The following describes an operating procedure implemented when a job execution is completed. FIG. 10 is a flowchart for explaining the operating procedure implemented by the job scheduling apparatus 10 at the job completion, according to the first embodiment.

When the current job is completed, the job ID associated with the completed job is reported from allocated computational resources 20 that executed the job. In Step S301, the end-of-job report receiving unit 14 of the job scheduling apparatus 10 receives the report. Next, the priority calculating unit 12 updates the latest-update-time dynamic priority $P_{update}$ of a user associated with the completed job (Step S302). This update is made according to the following calculation.

$$P_{update} \leftarrow P_{update} + r \times (T_{estimate} - T_{actual})$$

where $T_{actual}$ is the actual execution time period.

In the calculation, ($r \times T_{actual}$) corresponds to the actual utilization amount of the computational resources 20. That is, the update is for achieving an adjustment of the dynamic priority at the job end in FIG. 5. For the latest-update-time dynamic priority $P_{update}$ in the calculation, the value of a user structure associated with the job structure of the completed job is used. For the number of CPUs to be used r and the estimated execution time period $T_{estimate}$ in the calculation, the values recorded in the job structure of the completed job are used. The actual execution time period is calculated based on the job start time recorded in the job structure of the completed job and the time at which the end-of-job report is received. In the user structure associated with the user of the completed job, the latest-update-time dynamic priority $P_{update}$ is updated with the calculated latest-update-time dynamic priority $P_{update}$, and the latest update time $t_{update}$ is updated with the time at which the end-of-job report is received.

Thus, the above operating procedure achieves the dynamic priority control method of the present embodiment explained with reference to FIG. 5.

(b) Second Embodiment

Assume here that, in an environment where the dynamic priority control method according to the present embodiment is implemented, a large number of jobs of a single user ("User A") are submitted when a great amount of the computational resources 20 are not in use and available (a large number of CPUs are available). In this case, because there are no jobs of other users, it is likely that the jobs of User A in large number are executed even if User A is under the imposition of severe penalties.

Figure 11:
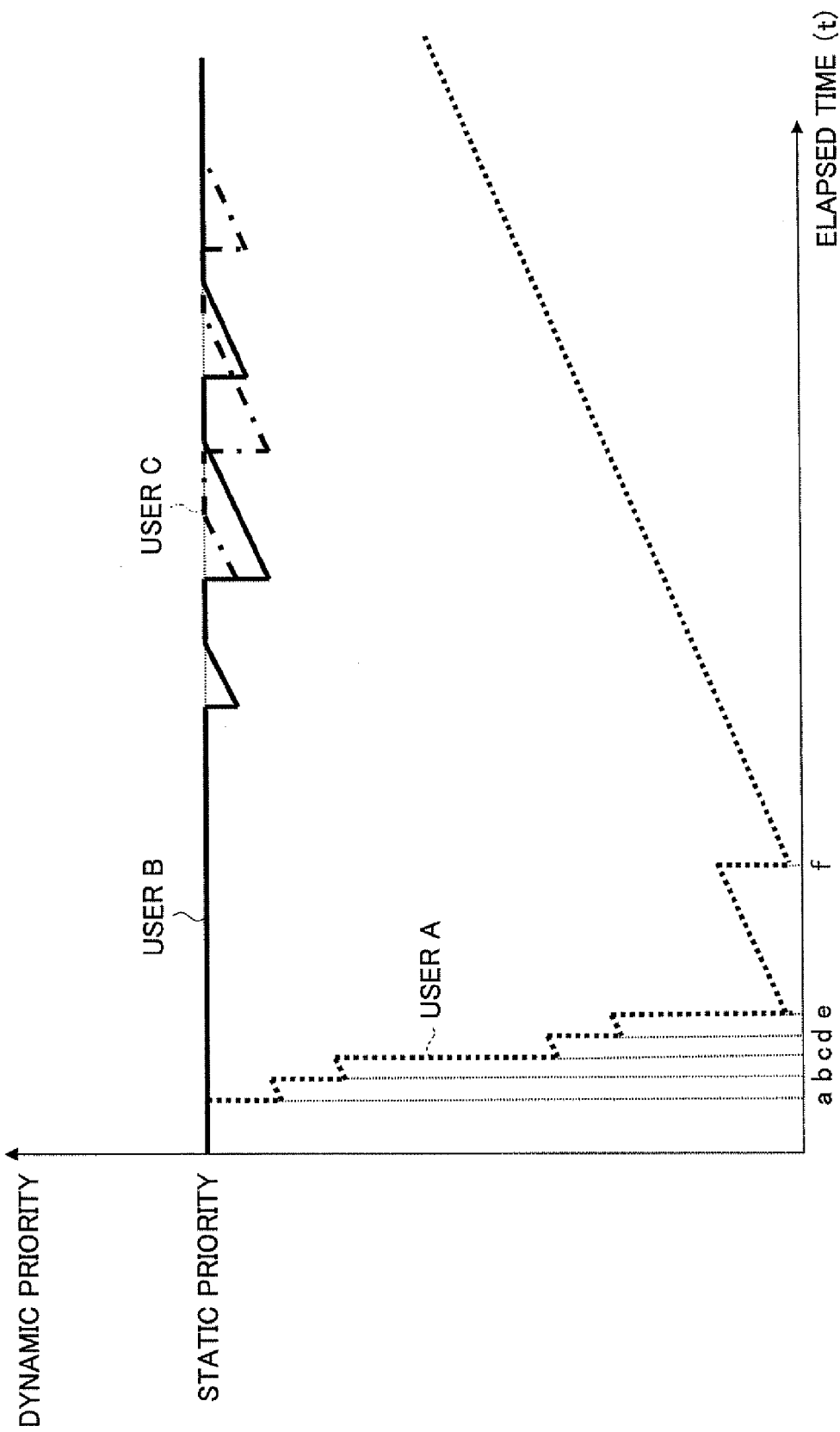
FIG. 11 shows an example of transition of the dynamic priority in the case where a large number of jobs of User A are submitted.

As a result, the dynamic priority of User A changes in the following manner. FIG. 11 shows an example of transition of the dynamic priority in the case where a large number of jobs of User A are submitted.

According to FIG. 11, the dynamic priority of User A decreases at time points a, b, c, d, e and f. The decrease at each time point is due to dispatch of a User A job. Accordingly, the dynamic priority of User A is dramatically lowered, and is not restored for a while. If jobs of other users are submitted under this situation, their jobs are continuously dispatched while dispatch of User A's jobs is kept postponed.

Next is described the second embodiment as an example of preventing such an occurrence. Note that components, structures, functions and the like, to which no particular descriptions are given in the second embodiments, may be considered as the same as those in the first embodiment.

In the second embodiment, the restoration rate of the dynamic priority is dynamically changed (with time). Specifically speaking, a predetermined time period T (for example, one year) is divided by N (no need for equal dividing). Each user reports in advance a planned utilization amount of the computational resources 20 for each divisional period in a manner not to exceed the amount of the computational resources 20 specified to be available to the user (e.g. the number of CPUs to be used x time period) over the time period T. The restoration rate of the dynamic priority is determined for each divisional period in accordance with the planned utilization amount in the divisional period.

Assume an example where one year is divided by N, and period dividing points are denoted by $t_0, t_1, \ldots$ and $t_n$. If a planned utilization amount for a time period between $t_n$ and $t_{n+1}$ is $r_n$, a restoration rate $R_n$ for the time period between $t_n$ and $t_{n+1}$ is calculated by the following equation (3).

$$R_n = r_n / T \tag{3}$$

By determining the restoration rate for each divisional period using Equation (3), it is possible to set the restoration rate in proportion to an amount of the computational resources 20 planned to be used during the divisional period. Specifically, a high restoration rate is set for a divisional period during which a large amount of the computational resources 20 are planned to be used. On the other hand, a low restoration rate is set for a divisional period during which a small amount of the computational resources 20 is planned to be used.

In order to achieve the above scheme (i.e. dynamically changing the restoration rate), with respect to each user, the restoration rate for each divisional period is recorded in the auxiliary storage device 102 of the job scheduling apparatus 10 as a part of the user information. In order to allow the restoration rate for each divisional period to be managed, the user structure may be configured, for example, in the following manner.

Figure 12:
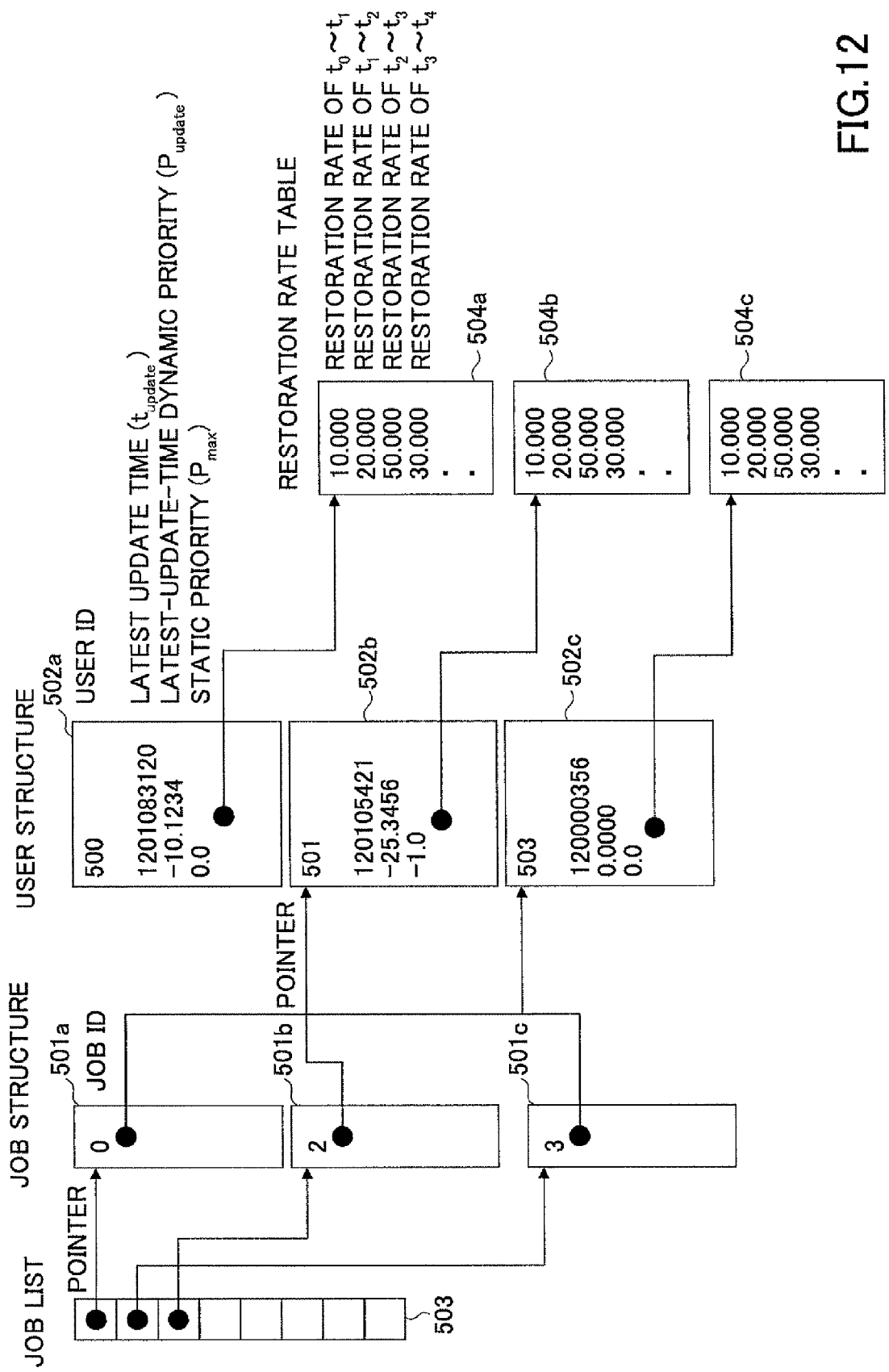
FIG. 12 shows an example of a data structure according to the second embodiment.

FIG. 12 shows an example of a data structure according to the second embodiment. In FIG. 12, the same reference numerals are given to the components which are common to those of FIG. 9, and their explanations are omitted.

Each user structure according to the second embodiment includes, as a member variable, a pointer corresponding to a restoration rate table (a restoration rate table 504a, 504b or 504c) of a user associated with the user structure. In each restoration rate table, the restoration rate for each divisional period is recorded.

Based on such a data structure, the priority calculating unit 12 calculates dynamic priorities of all users in Step S201 of FIG. 8. Specifically, the priority calculating unit 12 uses, for each user, a restoration rate corresponding to a divisional period during which the calculation is taking place. As a result, the dynamic priority of User A illustrated in FIG. 11 changes, for example, in the following manner.

FIGS. 13A and 13B show an example of transitions in dynamic priorities according to the second embodiment. FIG. 13A shows the transitions in the dynamic priorities and FIG. 13B shows transitions in planned utilization amounts for individual divisional periods. For example, as illustrated in FIG. 13B, during the divisional period between to and $t_0$, the planned utilization amount of User A is larger than those of other users. Accordingly, as depicted in FIG. 13A, the restoration rate of the dynamic priority of User A is comparatively high during the divisional period between $t_0$ and $t_1$. On the other hand, after $t_0$, the planned utilization amount of User A is smaller than those of other users. Accordingly, the restoration rate of the dynamic priority of User A is comparatively low after $t_1$.

Thus, according to the second embodiment, as long as the computational resources 20 are used within the range of the planned utilization amounts reported by the users, the dynamic priority of each user can be largely maintained near the maximum value without dramatic decreases. Therefore, it is possible to prevent a sudden decrease in the dynamic priority due to the use of a large amount of the computational resources 20, and thus, the dynamic priority can be maintained at an appropriate level.

Note that the above embodiments illustrate examples in which the utilization amount of the computational resources 20 is measured according to "the number of CPUs to be used×time period". However, in the case where there is no need to secure fairness regarding the number of CPUs to be used, the utilization amount may be measured only according to the time period for using the computational resources 20. For example, if each job uses the same number of CPUs, there is no need to secure fairness regarding the number of CPUs to be used.

All examples and conditional language used herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a showing of the superiority or inferiority of the present disclosure. Although the embodiments of the present disclosure have been described in detail, it should be understood that various changes, substitutions, and alterations could be made hereto without departing from the spirit and scope of the present disclosure.

What is claimed is:

1. A non-transitory computer-readable recording medium having stored therein a program for causing a computer to execute a priority control process comprising:

lowering a job allocation priority that indicates a priority order with which a plurality of jobs dispatched to a computational resource are allocated to a user, based on an estimated utilization amount of the computational resource recorded in a memory device for each of the plurality of jobs that are dispatched to the computational resource;

increasing the job allocation priority with a lapse of time at a restoration rate that is determined by a utilizable amount of the computational resource per unit time recorded in the memory device for each of a plurality of users; and changing, upon completion of one job, the job allocation priority based on a difference between the estimated utilization amount and an amount of the computational resource actually utilized for the one job, wherein the restoration rate for each of the plurality of users is recorded in the memory device for each of a plurality of time frames, depending on a planned utilization amount of the computational resource for each of the plurality of time frames.

2. The non-transitory computer-readable recording medium as claimed in claim 1, wherein the restoration rate is based on a value obtained by dividing the utilizable amount of the computational resource by the unit time.

3. The non-transitory computer-readable recording medium as claimed in claim 1, wherein the increasing stops increasing the job allocation priority after the job allocation priority reaches a maximum value recorded in the memory device for each of the plurality of users.

4. A priority control apparatus comprising:

a processor configured to execute a priority control process including:

lowering a job allocation priority that indicates a priority order with which a plurality of jobs dispatched to a computational resource are allocated to a user, based on an estimated utilization amount of the computational resource recorded in a memory device for each of the plurality of jobs that are dispatched to the computational resource;

increasing the job allocation priority with a lapse of time at a restoration rate that is determined by a utilizable amount of the computational resource per unit time recorded in the memory device for each of a plurality of users; and changing, upon completion of one job, the job allocation priority based on a difference between the estimated utilization amount and an amount of the computational resource actually utilized for the one job, wherein the restoration rate for each of the plurality of users is recorded in the memory device for each of a plurality of time frames, depending on a planned utilization amount of the computational resource for each of the plurality of time frames.

5. The priority control apparatus as claimed in claim 4, wherein the restoration rate is based on a value obtained by dividing the utilizable amount of the computational resource by the unit time.

6. The priority control apparatus as claimed in claim 4, wherein the increasing stops increasing the job allocation priority after the job allocation priority reaches a maximum value recorded in the memory device for each of the plurality of users.

7. A priority control method to be executed by a computer comprising:

lowering, by the computer, a job allocation priority that indicates a priority order with which a plurality of jobs dispatched to a computational resource are allocated to a user, based on an estimated utilization amount of the computational resource recorded in a memory device for each of the plurality of jobs that are dispatched to the computational resource;

increasing, by the computer, the job allocation priority with a lapse of time at a restoration rate that is determined by a utilizable amount of the computational resource per unit time recorded in the memory device for each of a plurality of users; and changing, by the computer, upon completion of one job, the job allocation priority based on a difference between the estimated utilization amount and an amount of the computational resource actually utilized for the one job, wherein the restoration rate for each of the plurality of users is recorded in the memory device for each of a plurality of time frames, depending on a planned utilization amount of the computational resource for each of the plurality of time frames.

8. The priority control method as claimed in claim 7, wherein the restoration rate is based on a value obtained by dividing the utilizable amount of the computational resource by the unit time.

9. The priority control method as claimed in claim 7, wherein the increasing stops increasing the job allocation priority after the job allocation priority reaches a maximum value recorded in the memory device for each of the plurality of users.

* * * * *